Aug. 26, 1952   E. L. DANIELSON ET AL   2,607,957
METHOD FOR FORMING A COMPOSITE PLASTIC STRUCTURE
Filed Jan. 2, 1951                 5 Sheets-Sheet 1
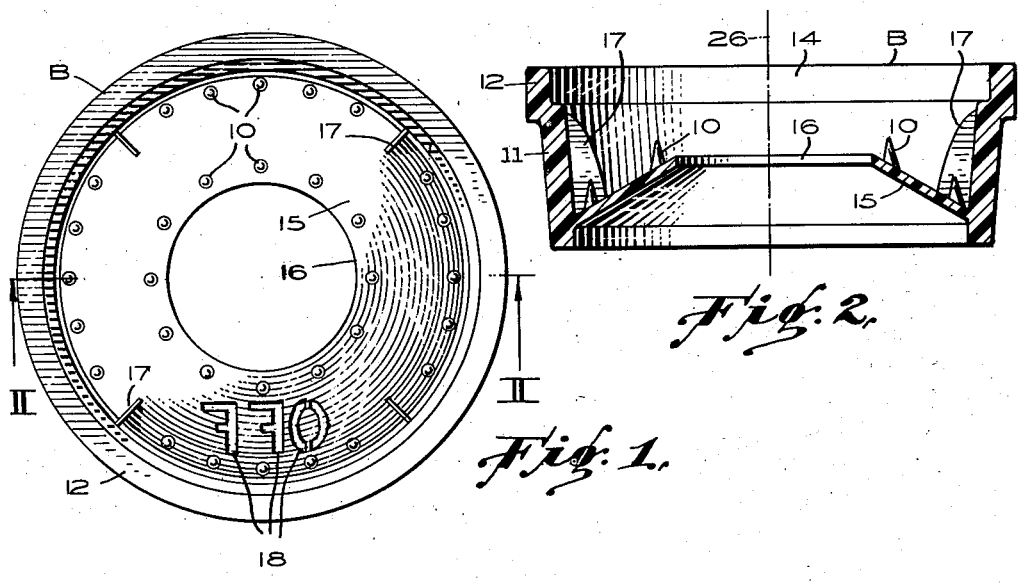
Fig. 1.
Fig. 2.
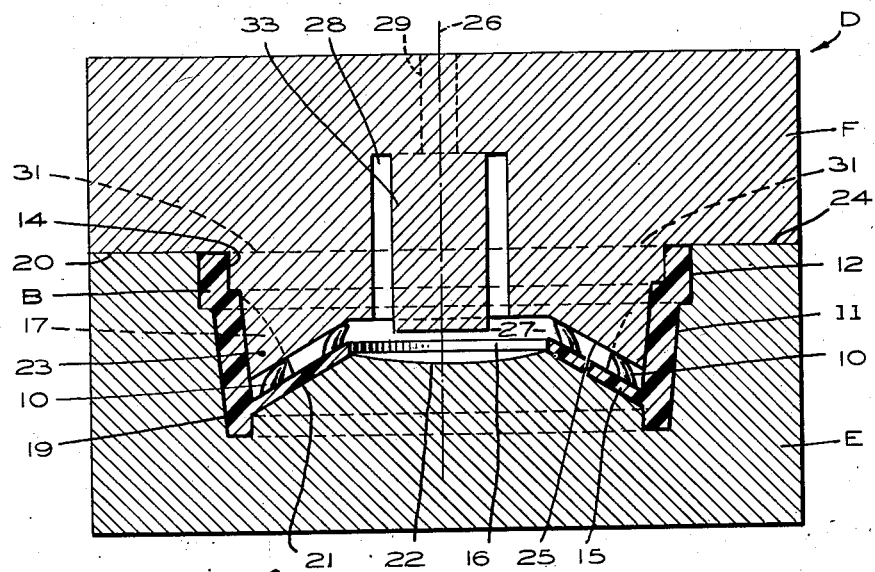
Fig. 3.
INVENTOR.
ELMER L. DANIELSON
FLOYD J. DOFSEN
BY
Munn, Liddy & Glaccum
ATTORNEYS

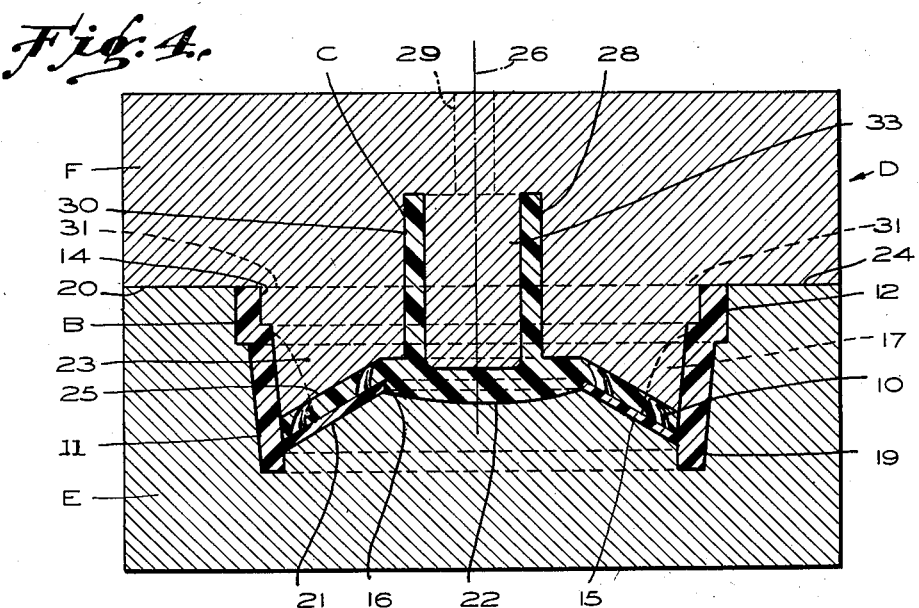
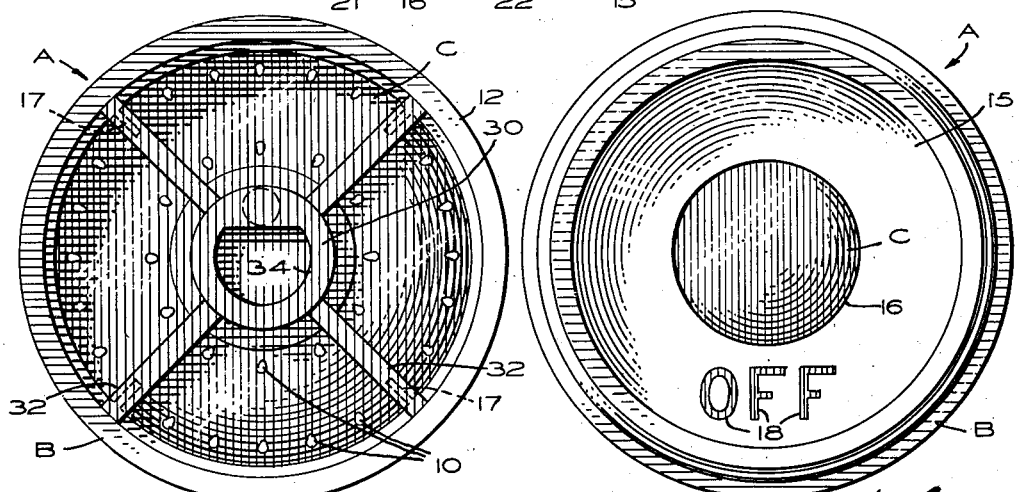
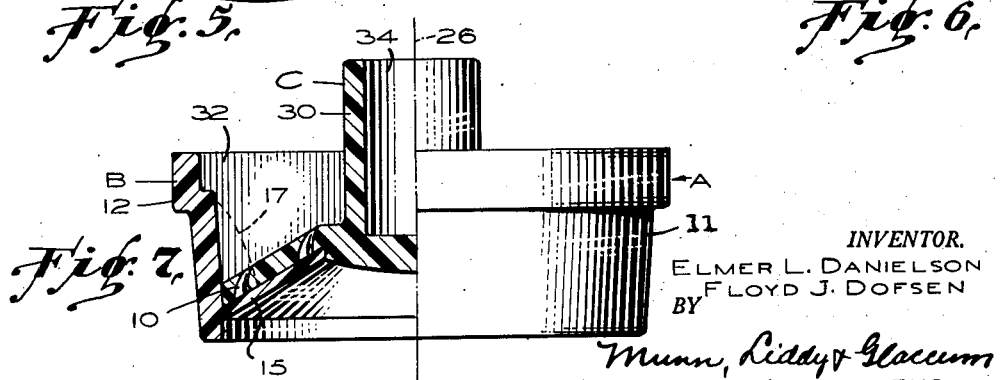

Aug. 26, 1952     E. L. DANIELSON ET AL     2,607,957
METHOD FOR FORMING A COMPOSITE PLASTIC STRUCTURE
Filed Jan. 2, 1951     5 Sheets-Sheet 3

*INVENTOR.*
ELMER L. DANIELSON
FLOYD J. DOFSEN
BY Munn, Liddy & Glaccum
ATTORNEYS Aug. 26, 1952     E. L. DANIELSON ET AL     2,607,957
METHOD FOR FORMING A COMPOSITE PLASTIC STRUCTURE
Filed Jan. 2, 1951     5 Sheets-Sheet 4

*INVENTOR.*
ELMER L. DANIELSON
FLOYD J. DOFSEN
BY Munn, Liddy & Glaceum
ATTORNEYS

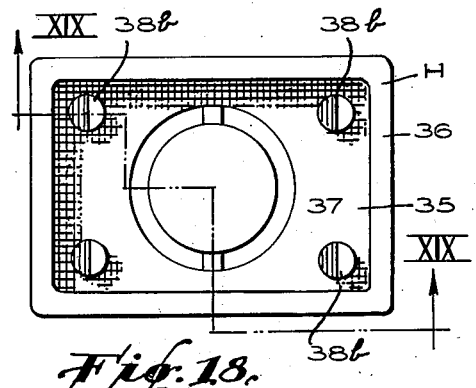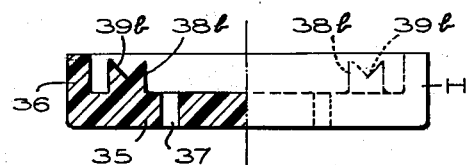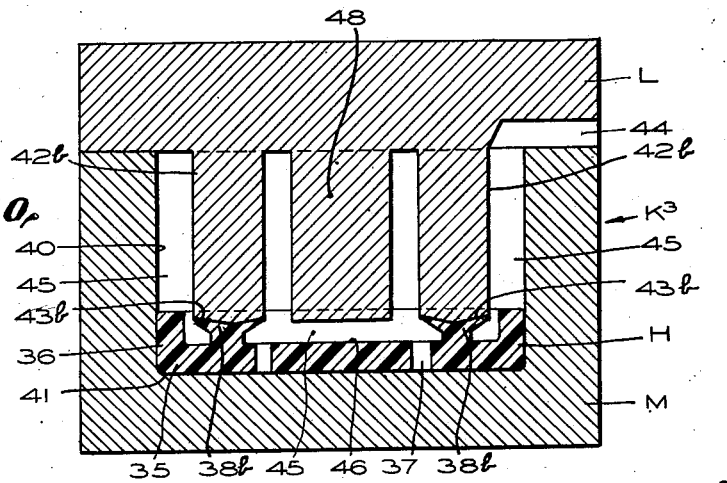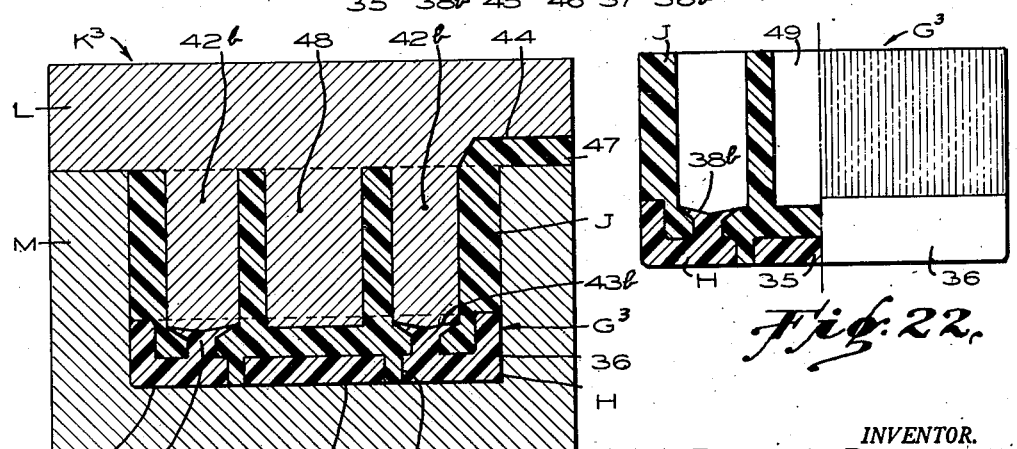

Patented Aug. 26, 1952

2,607,957

UNITED STATES PATENT OFFICE 2,607,957

METHOD FOR FORMING A COMPOSITE PLASTIC STRUCTURE

Elmer L. Danielson, Oakland, and Floyd J. Dofsen, San Francisco, Calif.

Application January 2, 1951, Serial No. 203,992

8 Claims. (Cl. 18—59)

The present invention relates to improvements in a method for forming a composite plastic structure. It consists of the steps of the method as hereinafter described and claimed.

An object of our invention is to provide a composite plastic structure, composed of at least two parts, which are mechanically interlocked during the casting operation. Broadly speaking, these structures may be key caps for calculators or typewriters, telephone dials, stove knobs, etc. Such structures are mentioned by way of illustration only, and we do not wish to be limited in this respect.

Briefly stated, we cast a first part of the plastic structure, with projections extending from a surface thereof against which a second plastic part is to be cast. This precast part is placed in a cavity provided in one die of a mold, and thereafter a second die is moved into coacting relation with the first to close the mold. During the closing of the mold, the projections are automatically deflected, or upset, and are retained in these positions by the dies. Upon injecting the material for the second plastic part of the composite structure, it is conveyed over the surface of the precast part and around the projections to embed the latter therein. Thus the projections mechanically interlock the two plastic parts.

Other objects and advantages will appear as the specification continues. The novel features of the invention will be set forth in the claims hereunto appended.

Drawings

For a better understanding of our invention, reference should be had to the accompanying drawings, forming part of this application, in which:

Figure 1 is a rear elevational view of a precast plastic part for a stove knob;

Figure 2 is a vertical sectional view taken along the line II—II of Figure 1;

Figure 3 illustrates this precast part for the stove knob being disposed in a cavity of a mold die, and a second die moved into position relative to the first die to close the cavity and to deflect the projections;

Figure 4 is a view similar to Figure 3, but disclosing the plastic material for the second part cast against the first, the two parts of the composite stove knob being interlocked;

Figure 5 is a rear elevational view of the completed stove knob;

Figure 6 is a front elevational view of the same knob;

Figure 7 is a side elevational view of the completed knob, portions being shown in section;

Figure 10:
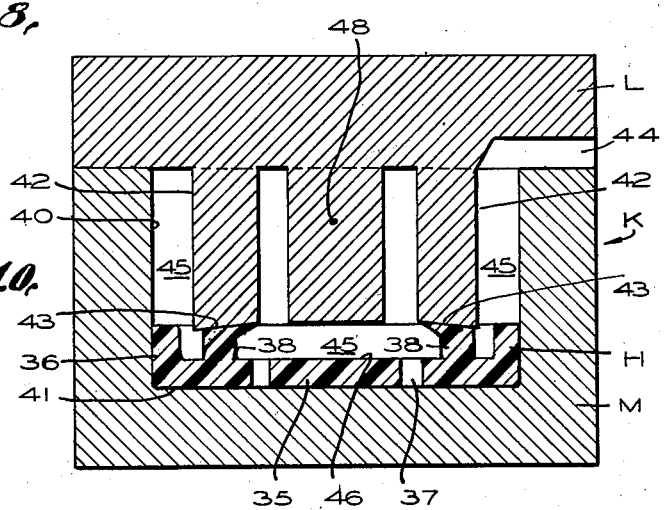
Figure 11:
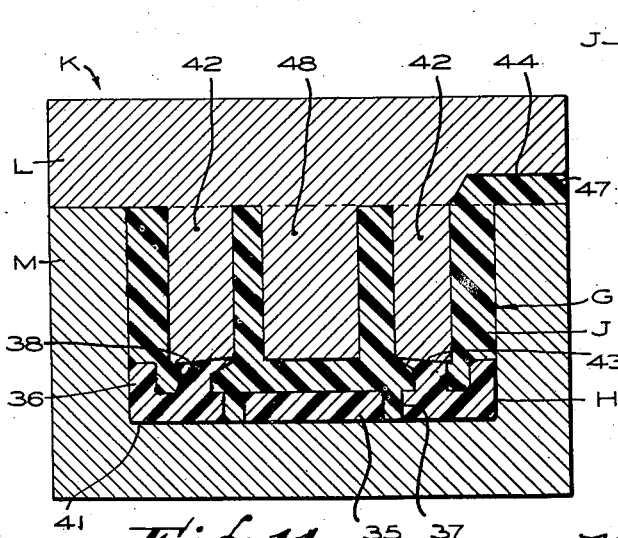
Figure 12:
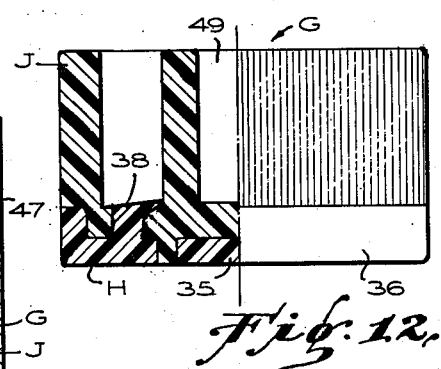
Figure 13:
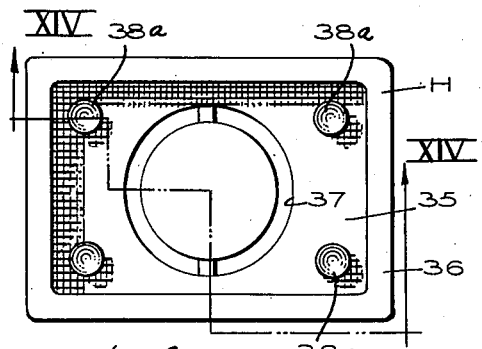
Figure 14:
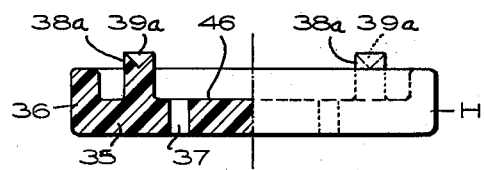
Figure 15:
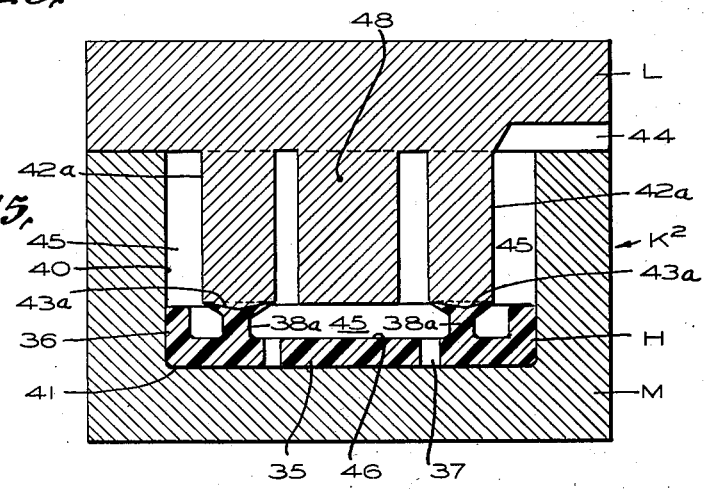
Figures 16, 17:
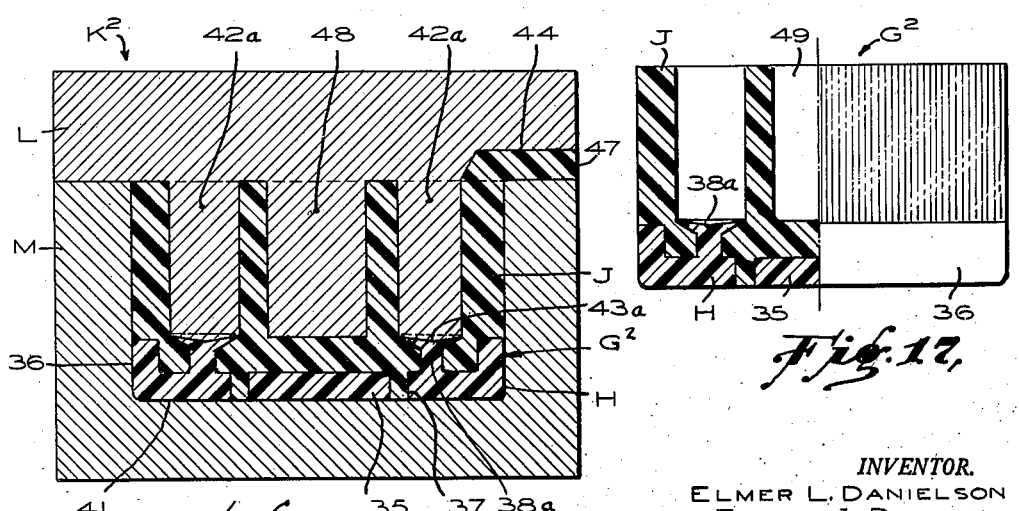

Figure 10 discloses this precast part (Figure 8) disposed in a mold die cavity, with a second die inserted into the first die so as to close the cavity, the projections on the precast part being deflected or upset in opposite directions;

Figure 11 is a view similar to Figure 10, after the injection of the plastic material for the second part of the key cap has been completed;

Figure 12 is an elevational view, partly in section, of this first form of the key cap;

Figure 13 is a rear view of a second form of a precast part for a key cap, wherein projections having conical-shaped indented ends are provided;

Figure 14 is a sectional view taken along the line XIV—XIV of Figure 13, parts being shown in elevation;

Figure 15 discloses the precast part of this second modified key cap (Figure 13) disposed in the dies of a closed mold;

Figure 16 is a view similar to Figure 15, after the injection of the plastic material for the second part of the key cap has been accomplished;

Figure 17 is an elevational view, partly in section, of this second form of key cap;

Figure 18 is a rear elevational view of a third modification of a precast part for a key cap, in which V-shaped notches are fashioned in the ends of the projections;

Figure 19 is a sectional view, partly in elevation, taken along the line XIX—XIX of Figure 18;

Figure 20 illustrates this third form of the precast part of a key cap as being disposed in the closed dies of a mold;

Figure 21 is a view corresponding to Figure 20, but showing the plastic material for the second part of the key cap injected into the closed mold; and Figure 22 is an elevational view, partly in section, of the third embodiment of our key cap.

While we have shown only the preferred forms of our invention, it should be understood that various changes, or modifications, may be made within the scope of the annexed claims without departing from the spirit thereof.

Detailed description

Referring now to Figures 1 to 7, inclusive, we have illustrated therein our method for forming a composite plastic structure, which defines a stove knob indicated generally at A. This final product is disclosed in Figures 5, 6 and 7. It includes a precast first part B and a subsequently-cast second part C that are mechanically interlocked by projections 10.

As illustrated in Figures 1 and 2, the precast part B is fashioned with a downwardly-converging frusto-conical shell 11 having an outwardly-extending annular flange 12 at its top. Within the bore 14 of this shell, we provide an upwardly-extending frusto-conical flange 15, the latter being formed with an opening 16 at the top thereof. Reinforcing gussets 17 are arranged between the shell 11 and the internal flange 15. The projections 10 are carried by and rise from the upper surface of the flange 15.

The first part B is cast from suitable plastic material, with the shell 11, internal flange 15, gussets 17 and projections 10 being formed into an integral unit. In Figure 1, we show slots 18 piercing the flange 15 to define the word "Off" (also, see Figure 6).

Turning now to Figures 3 and 4, we disclose a mold indicated generally at D. This mold includes lower and upper dies E and F, respectively. In its structural features, the lower die defines a cavity 19 extending downwardly thereinto from the upper surface 20 of this die. The walls of the cavity are shaped to correspond with and support the exterior surfaces of the shell 11 and its external flange 12. Also, the bottom 21 of this cavity bears against the underneath surface of the internal flange 15. A slightly-concaved recess 22 is provided in the bottom of the cavity immediately below the opening 16.

After the precast part B has been disposed in the cavity of the lower die E, as shown in Figure 3, with the projections 10 extending upwardly, the upper die F is moved into coacting relation with the lower die to close the mold. As clearly shown in Figures 3 and 4, the upper die has a core 23 extending downwardly into the cavity 19 when the lower surface 24 of the die F abuts the upper surface 20 of the die E.

The core 23 has a frusto-conical underneath surface 25, which conforms to the taper of the internal flange 15 of the precast part B. As the mold is closed, the core 23 will deflect the projections 10 automatically, inclining them toward the vertical axis 26 of the precast part.

When the dies E and F are brought together, a space 27 above the upper surface of the internal flange 15 receives an injection of plastic material, which forms the cast second part C. This space communicates with an annular groove 28, which is fashioned in the upper die. An orifice 29 receives the plastic material from an injection nozzle (not shown), and conveys this material to the annular groove 28. Thence the material flows into the space 27, and spreads out over the upper surface of the internal flange 15 of the precast first part B.

Moreover, the incoming plastic material flows around and embeds the deflected projections 10, and extends through the opening 16 into the concaved recess 22. Part of this material will find its way through the slots 18, producing the word "Off." It will be noted that the core 23 holds the projections 10 in their deflected positions during the casting of the second part of the composite plastic structure.

The plastic material entering the annular groove 28 will provide a hub 30 on the final product (see Figures 5 and 7). The upper die F has radially-extending grooves 31 therein, which receive the gussets 17 and convey a portion of the incoming material to form webs 32 extending between the hub 30 and the shell 11. These webs embed the gussets 17 therein (see Figures 5 and 7).

For the purpose of securing the knob A to the control stem of a gas valve on a stove, the upper die F includes a central core 33. This core produces a stem-receiving bore 34 within the hub 30, which is non-circular in cross-section (see Figure 5).

Upon separating the dies of the mold, the completed stove knob A may be readily removed therefrom. The deflected projections 10 provide mechanical interlocks between the parts B and C of the plastic structure. As previously pointed out, our method is not to be limited to the production of stove knobs. The two parts of the composite plastic structure may be made in any contrasting colors desired. For the purpose of illustration, the precast part B has been shown in white, while the part C has been shaded to indicate red.

It will be noted from Figures 8 to 12, inclusive, that we provide a key cap designated generally at G. This composite plastic structure includes a precast first part H and a subsequently-cast second part J. In the final product, as shown in Figure 12, the part H becomes a face member for the cap, while the part J forms the shell-like body for the key cap.

Figure 8:
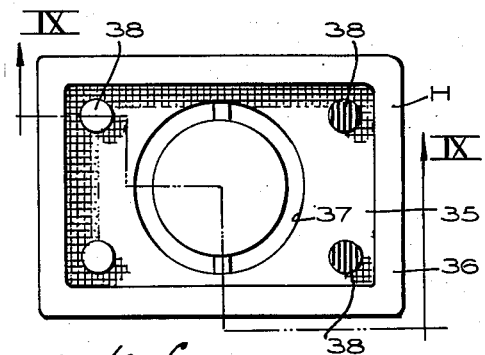
Figure 8 is a rear elevational view of a precast part for a key cap on which oppositely-tapered projections are provided.
Figure 9:
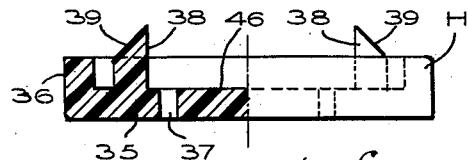
Figure 9 is a vertical sectional view taken along the line IX—IX of Figure 8, parts being shown in elevation.

In Figures 8 and 9, we disclose the precast first part as including a base 35 having an upstanding marginal flange 36 extending around the perimeter thereof. The base is fashioned with a slot 37 through which material of the part J extends in the final product to produce a desired character. As herein illustrated, this character consists of the letter "O."

The precast part H further has projections 38 formed integral with and rising from the base 35. When this part is made, the upper ends 39 of these projections are bevelled in the manner shown in Figure 9.

For the purpose of completing the key cap G after the precast part H has been made, we provide a mold designated generally at K in Figures 10 and 11. This mold includes upper and lower dies L and M, respectively. The lower die has a cavity 40 therein, which is designed to receive and support the precast first part H (see Figure 10), with the base 35 resting on the bottom 41 of the die cavity and the projections 38 extending upwardly.

Now the upper die L is brought into position to close the open end of the die cavity 40. Cores 42 extend downwardly from this die and have inclined lower ends 43. As the mold is closed, the cores 42 strike the projections 38 and upset them in opposite directions (see Figure 10).

At this time, plastic material for the second part J of the final structure is injected through an orifice 44 into the unoccupied space 45 of the die cavity. While the projections are held in upset positions, the incoming plastic material flows over the upper surface 46 of the base 35 and embeds the projections; and, at the same time, provides the body J for the key cap.

Upon opening the mold K, the completed key cap G may be withdrawn, and the undesired sprue 47 removed. The parts H and J may be made of any desired contrasting colors. The upset projections 38 provide mechanical interlocks between the two plastic parts. A central core 48 is carried by the upper die to leave a shank-receiving recess 49 in the final product.

The second embodiment of the key cap $G^2$ and the modified mold $K^2$ shown in Figures 13 to 17, inclusive, are very similar to the embodiment just described. Accordingly, like reference numerals will be applied to corresponding parts. Now the differences will be pointed out, in which the letter "a" will be added to the reference numerals of the changes.

As shown in Figures 13 and 14, the projections $38a$ on the precast part H have conical-shaped recesses $39a$ fashioned in the upper ends thereof. The lower ends of the cores $42a$ carried by the upper die L are tapered, as at $43a$. Accordingly, when the mold $K^2$ is closed, the projections $38a$ will be spread outwardly, or upset, in the manner shown in Figure 15. These upset projections provide mechanical interlocks between the parts H and J of the modified key cap $G^2$. Otherwise, the construction and operation of the mold $K^2$, and the final product are the same as that previously described in connection with Figures 8 to 12, inclusive.

Likewise, the third modification of the key cap $G^3$ and the modified mold $K^3$ disclosed in Figures 18 to 22, inclusive, are similar to the forms disclosed in Figures 8–12 and 13–17. The same reference numerals have been used to designate corresponding parts. The letter "b" has been added to the changed portions.

It will be noted from Figures 18 and 19 that projections $38b$ are fashioned on the precast part H so as to have V-shaped grooves $39b$ in their upper ends. The cores $42b$ on the upper die L of the mold $K^3$ have wedged-shaped lower ends $43b$. The part H is placed in the cavity 49 of the lower die M, with the projections $38b$ extending upwardly. Upon closing the mold, as shown in Figure 20, each projection is upset or spread in opposite directions.

Upon injecting the material into the mold to form the subsequently-cast part J, the upset projections $38b$ will be embedded therein, with these projections providing mechanical interlocks between the two parts of the plastic structure.

In all forms disclosed herein, projections are provided on the precast first part near the outer edges thereof. This will prevent shrinkage of the subsequently-cast part. Also, portions of the upper die hold the projections in deflected or upset position during casting of the second part.

We claim:

1. In the herein described method of forming a composite plastic structure, which includes the steps of: precasting a plastic first part of the structure with spaced-apart projections extending from a surface thereof against which a second part is to be cast subsequently; deflecting these projections into angular positions relative to said surface, while maintaining the first part and the projections in a solidified condition; and thereafter injecting heated plastic material for a second part of the structure against said surface for flowing around and embedding the deflected projections, while still holding the projections in their deflected positions until the second part solidifies, whereby the angularly-disposed projections will be precluded from returning to their original positions and will mechanically interlock the two solidified parts.

2. The combination as set forth in claim 1, in which the projections are deflected toward one another so as to resist separation of the two parts.

3. In the herein described method of forming a composite plastic structure, which includes the steps of: precasting a plastic first part of the structure with at least one projection extending from a surface thereof against which a second part is to be cast subsequently; deflecting this projection into angular position relative to said surface, while maintaining the first part and the projection in a solidified condition; and thereafter injecting heated plastic material for a second part of the structure against said surface for flowing around and embedding the deflected projection, while still holding the projection in its deflected position until the second part solidifies, whereby the angularly-disposed projection will be precluded from returning to its original position and will mechanically interlock the two solidified parts.

4. In the herein described method of forming a composite plastic structure, which includes the steps of: precasting a plastic first part of the structure with at least one projection extending from a surface thereof against which a second part is to be cast subsequently; upsetting the end of this projection to provide an enlarged head overlying and spaced from said surface, while maintaining the first part and the projection in a solidified condition; and thereafter injecting heated plastic material for a second part of the structure against said surface for flowing around and embedding the projection and its head, while still holding the end of the projection in its upset condition until the second part solidifies, whereby said end of the projection will be precluded from returning to its original position and will mechanically interlock the two solidified parts.

5. The combination of steps as set forth in claim 4, in which the projection is formed initially with a bevelled end, and the latter is deformed laterally during the upsetting thereof.

6. The combination of steps as set forth in claim 4, in which the projection is formed initially with a conical-shaped recess end, and the material near this end is expanded outwardly in radial directions during the upsetting thereof.

7. The combination of steps as set forth in claim 4, in which the projection is formed initially with a substantially V-shaped groove in its end, and the material near this end is expanded outwardly in opposite directions during the upsetting thereof.

8. In the herein described method of forming a composite plastic structure, the steps of: precasting a plastic first part with at least one projection extending from a surface thereof against which a second part is to be cast subsequently; placing this precast part in a cavity of a first die, with the wall of this cavity supporting the precast part, and the projection extending toward an open end of the cavity; moving a second die into coacting relation with the first die to close the open end of the cavity, while utilizing the second die to deflect and hold the projection in angular position relative to said surface; and thereafter injecting heated plastic material into the unoccupied portion of the die cavity to cast a second part of the structure against said surface, which embeds the deflected projection therein, while the second die still holds the projection in its deflected position until the second part solidifies, whereby the angularly-disposed projection will be precluded from returning to its original position and will mechanically interlock the two solidified parts.

ELMER L. DANIELSON.
FLOYD J. DOFSEN.

REFERENCES CITED

The following references are of record in the file of this patent:

UNITED STATES PATENTS

| Number | Name | Date |
|---|---|---|
| 1,200,992 | Searles | Oct. 10, 1916 |
| 1,284,553 | Apple | Nov. 12, 1918 |
| 1,401,283 | Schumacher | Dec 27, 1921 |
| 1,668,590 | Hilfreich | May 8, 1928 |
| 2,062,880 | Hansen | Dec. 1, 1936 |
| 2,222,755 | Watson | Nov. 26, 1940 |
| 2,483,832 | Kingston | Oct. 4, 1949 |